United States Patent [19]
Carpenter

[11] Patent Number: 5,183,352
[45] Date of Patent: Feb. 2, 1993

[54] PIVOT JOINT

[75] Inventor: Peter J. Carpenter, Labertouche, Australia

[73] Assignee: Trico Products Corporation, Buffalo, N.Y.

[21] Appl. No.: 838,484

[22] Filed: Feb. 19, 1992

[30] Foreign Application Priority Data

Feb. 20, 1991 [AU] Australia .............................. PK4687

[51] Int. Cl.⁵ .............................................. F16C 11/00
[52] U.S. Cl. .................................... 403/79; 15/250.42; 403/24
[58] Field of Search .................. 403/79, 24; 15/250.42

[56] References Cited
U.S. PATENT DOCUMENTS
4,788,736 12/1988 Arai et al. .......................... 15/250.42

FOREIGN PATENT DOCUMENTS
2803343 8/1979 Fed. Rep. of Germany ... 15/250.42

Primary Examiner—Andrew V. Kundrat
Attorney, Agent, or Firm—Joseph G. Nauman

[57] ABSTRACT

A pivot joint is disclosed for pivoting together first and second members. The first at least is of channel section at the joint and the second seats within the first. The pivot joint has a joint body intermediate the first and second members. The joint body has a pair of inwardly extending trunnions each provided with a coaxial bore. Each trunnion cooperates with apertures in the second member and the coaxial bores in the trunnions are aligned with apertures in the first member. A pivot pin extends through the apertures of the first and second members and through the bores of the trunnions of the joint body. The pin is retained in the bores by positive engagement of portions of the pin with inwardly directed resilient collars in the trunnions of the joint body. A joint body for use in the pivot joint is also disclosed.

6 Claims, 2 Drawing Sheets

PIVOT JOINT

This invention relates to a pivot joint which is particularly, but not exclusively, useful in the manufacture of windscreen wipers.

In the manufacture of windscreen wipers, a number of pivot joints are used, particularly between the various yokes and/or levers of the windscreen wiper blade.

Due to the frequent necessity in the manufacture of windscreen wiper blades of pivoting metal parts together, considerable problems exist with current manufacturing techniques. These joints are frequently noisy, and suffer from a tendency to wear and corrode. One proposal for overcoming this problem is the provision of a plastic member between the metal parts of the joints.

Generally with arrangements of this kind, complicated assembly procedures are needed which are difficult to automate and often hand assembly techniques are needed. Often, in windscreen wiper technology a rivet might be used as the pivot joint between two members, however, rivet applicator tools are difficult to use in automated machinery. Australian Patent No. 596278 discloses a pivot joint for use in a windscreen wiper assembly. In this configuration a plastic joint body member is provided between inner and outer metal channel shape yokes being relatively pivoted. The joint body member has outwardly extending trunnions which are received in appropriately shaped openings in the outer yoke member. The joint body member is thus fixed relative to the outer yoke member. A pair of aligned bores extend through the two yokes and are appropriately arranged to receive a pivot pin therethrough. The difficulty with this arrangement is that the joint body must first be fitted and retained within the outer yoke member by engagement of the trunnions in their mating apertures and this arrangement makes it difficult to use automated machinery in the assembly of the joint. Moreover, because the mating apertures are located inside the joint body member itself, flexibility of these apertures is limited and assembly and disassembly of the pivot joint is difficult.

Accordingly, the objective of the present invention is to provide a pivot joint which maintains the advantage of a plastics joints body member between the relatively pivoting metal yoke but which allows the parts forming the joint to be simply positioned one within the other with the pivot connection being achieved by a pivot pin that can be simply pushed through the assembly from one side. Preferably it is proposed to provide a pivot joint structure of the aforementioned kind which uses symmetric parts that do not require special orientation during assembly.

To this end there is provided a pivot joint for pivoting together first and second members, at least the first of which is of channel section at the joint and the second of which is adapted to seat within the first, the pivot joint comprising a joint body of generally channel section adapted to seat within the first member and to receive the second member therewithin, the joint body having a pair of inwardly extending trunnions each provided with a coaxial bore, and each of said trunnions being adapted to cooperate with apertures in the second member therewithin, said coaxial bores through said trunnions adapted to be aligned with apertures in the first member and a pivot pin adapted to extend through the apertures of the first and second members and through the bores of the trunnions of the joint body, the pin being retained in the bores of the joint body by positive engagement of portions of the pin with inwardly directed resilient collars on the trunnions of the joint body.

This invention is predicated upon the surprising discovery that by providing the joint body with inwardly extending trunnions upon which are resilient collars, the first and second members which are usually made of metal, can be pivoted together in a manner which is economic in its use of materials, is easy to manufacture and avoids wear, corrosion and noise during use.

In a preferred aspect of the invention, the trunnion is annular and the resilient collar on each said trunnion forms a frusto-conical shape such that the innermost edge of said collars have an internal diameter less than the diameter of the bore of the trunnion to which it is attached. More particularly, because the resilient collars on the trunnions are flexible in an unobstructed space, i.e. inside the channel of the second member, assembly and disassembly of this pivot joint is facilitated in a manner which is superior to the joint of the prior art.

Preferably the pivot pin has enlarged end portions, the diameter of these portions of the pivot pin being preferably substantially equivalent to the diameter of the bores through the trunnions. The diameter of the intermediate portion of the pivot pin is preferably substantially equivalent to the internal diameter of the innermost edge of the resilient collar.

In another aspect of the invention the resilient collar may be radially segmented so as to form fingers thereby allowing greater flexibility.

In another aspect of this invention there is provided a joint body for use intermediate two members, at least one of which is of channel section, said joint body being of generally channel section and having a pair of inwardly extending trunnions each provided with an inwardly directed resilient collar, each said trunnion having a bore therethrough.

In a preferred aspect of this invention the resilient collars provided on the inwardly extending trunnions of said joint body form a frusto-conical shape such that, the innermost edge of said collars have an internal diameter less than that of the diameter of the bore in each trunnion.

In a further preferred aspect of this invention, the resilient collar is radially segmented so as to form fingers thereby allowing greater flexibility.

The most preferred aspect of the invention will now be described with reference to the accompanying drawings in which.

Figure 1:
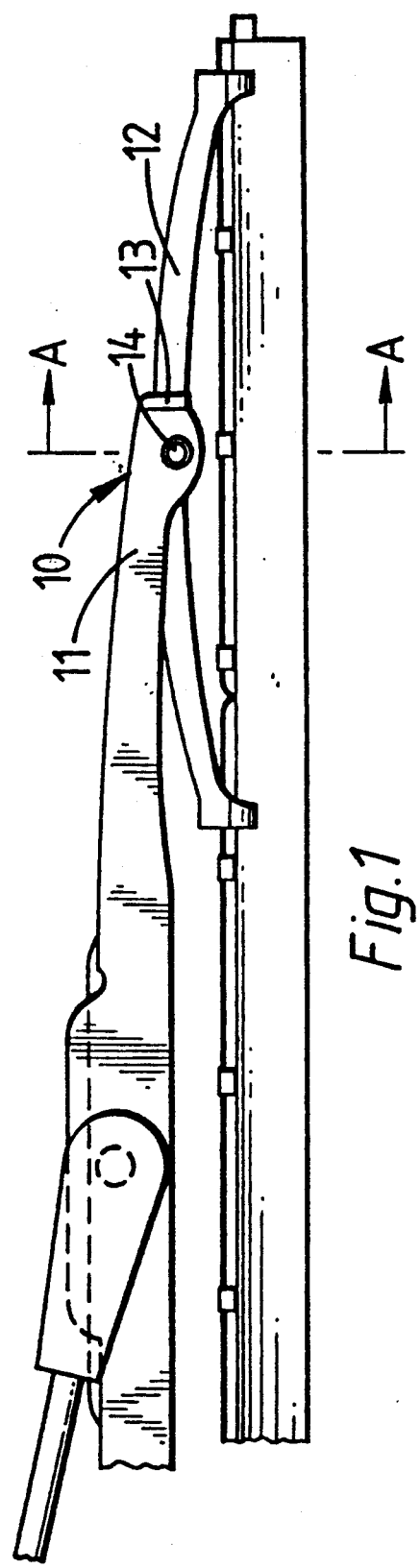
FIG. 1 is a perspective view of one form of pivot joint in accordance with the invention as applied to the joint between primary and secondary yokes of a windscreen wiper blade harness.

Referring to FIG. 1 of the drawings, there is shown a pivot joint 10 between one end of the primary yoke 11 of the harness of a windscreen wiper blade and the secondary yoke 12, the joint being completed by joint body 13 lying mainly between the two yokes 11 and 12, and a pivot pin 14 passing through both yokes 11 and 12 and the joint body 13. In the embodiment shown in FIG. 2, it can be seen that the primary yoke 11 is generally channel section. The secondary yoke 12 is of the usual channel section so as to form an extension of the shape of the primary yoke 11 when in use. It will be seen that the dimensions of the secondary yoke 12 are such that, at the joint, it will sit within the channel of the primary yoke 11 with sufficient clearance to permit the interposition of the joint body 13.

Figure 2:
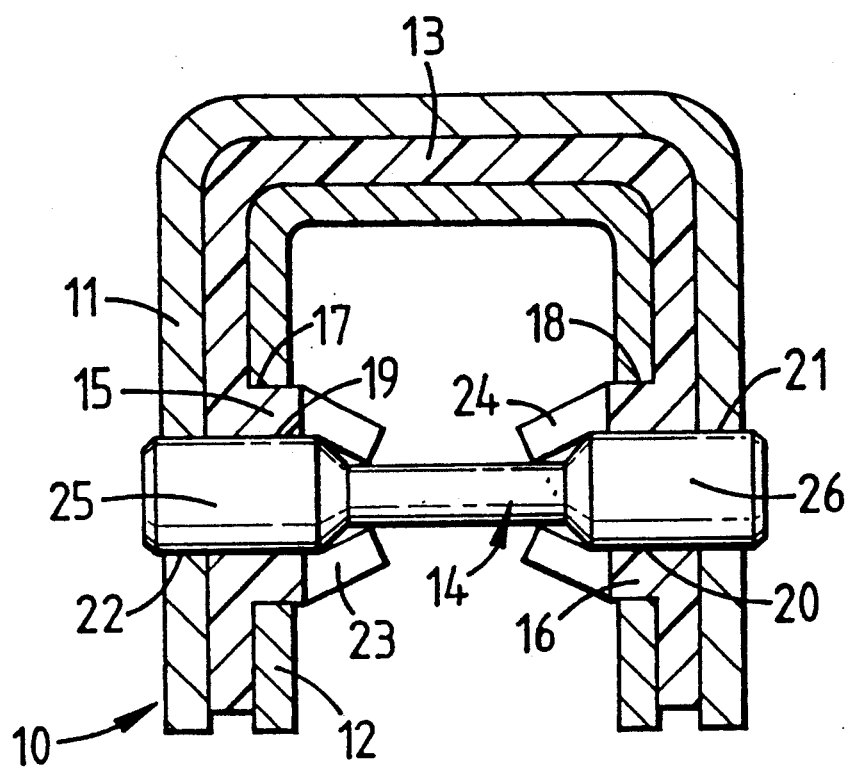
FIG. 2 is a sectional view of the joint taken on the line M of FIG. 1.

The joint body 13 can be particularly seen from FIG. 2. It comprises a generally channel shaped plastic moulding and is shaped exteriorly to enable it to fit snugly inside the channel of the primary yoke 11. It is shaped interiorly to enable the secondary yoke 12 to fit snugly inside it. The joint body exhibits a pair of trunnions 15 and 16 which are generally aligned for a purpose to be described hereafter. In this position they pass into apertures 17 and 18 in the secondary yoke 12.

A bore 19 and 20 is formed in each of the trunnions 15 and 16 respectively, the bore 20 in the right hand trunnion 16 being coaxial with the trunnion 16 and the bore 19 in the left hand trunnion 15 also being coaxial with the trunnion 15. These bores 19 and 20 are additionally aligned with a pair of apertures 21 and 22 in the side walls of the primary yoke 11. The trunnions 15 and 16 are provided with frusto-conical inwardly extending resilient collars 23 and 24, the innermost internal diameter of which is less than the diameter of the bores 19 and 20. Conveniently the resilient collars 23,24 are slotted axially to form at least two opposed parts or a plurality of axially and radially inwardly inclined resilient fingers.

The joint is completed by the pivot pin 14 which may be of metal or plastics material. The pivot pin has enlarged ends 25 and 26 which are substantially equivalent in diameter to the diameter of the bores 19 and 20. The central portion of the pivot pin 14 has a diameter substantially equivalent to the internal diameter of the resilient collars 23 and 24. The enlarged ends of 25 and 26 of the pivot pin 14 are intended to positively engage the resilient collars 23 and 24 so as to hold the pivot pin 14 in place in the bores 19 and 20.

The pivot pin 14 is preferably symmetrically shaped about a transverse centre line whereby during assembly the orientation of the pin is not critical when it is pushed through the pivot joint from one side to form the assembled condition as shown in FIG. 2. Conveniently, each outer end of the pin heads 25 and 26 are chamfered at 27,28 to assist in the assembly operation.

It will be appreciated that various modifications may be made to the above described embodiments without departing from the scope of the invention.

While the invention has been described with particular reference to the harness of a windscreen wiper blade, it is to be understood that the invention is not limited to the windscreen wiper field but may also be applied to any situations in which a similar pivot joint as required.

The claims defining the invention are:

1. A pivot joint for pivoting together first and second members, at least said first member being of channel section at said joint and said second member being adapted to seat within said first member, said pivot joint comprising:
a joint body of channel section adapted to seat within said first member and to receive said second member therewithin, said joint body having a pair of inwardly extending trunnions, each said trunnion having a bore therethrough, and being adapted to cooperate with corresponding apertures in said second member therewithin, each said bore being coaxial with apertures in said first member;
a pivot pin adapted to extend through said apertures of said first and second members and through each said bore in said trunnions of said joint body;
said pivot pin being retained in each said bore of said joint body by engagement with an inwardly directed resilient collar on each of said trunnions of said joint body; and
wherein said trunnions are annular and each said resilient collar is frusto-conical in shape such that an innermost edge of each said collar has an internal diameter less than a diameter of said bore in said trunnions to which it is attached.

2. A pivot joint as claimed in claim 1 wherein said pivot pin has enlarged end portions of a diameter substantially equivalent to said diameter of said bore in said trunnion so as to positively engage with each said resilient collar.

3. A pivot joint as claimed in claim 1 wherein an intermediate portion of said pivot pin has a diameter substantially equivalent to said internal diameter of said innermost edge of each said collar.

4. A pivot joint for pivoting together first and second members, at least said first member being of channel section at said joint and said second member being adapted to seat within said first member, said pivot joint comprising:
a joint body of channel section adapted to seat within said first member and to receive said second member therewithin, said joint body having a pair of inwardly extending trunnions, each said trunnion having a bore therethrough, and being adapted to cooperate with corresponding apertures in said second member therewithin, each said bore being coaxial with apertures in said first member;
a pivot pin adapted to extend through said apertures of said first and second members and through each said bore in said trunnions of said joint body;
said pivot pin being retained in each said bore of said joint body by engagement with an inwardly directed resilient collar on each of said trunnions of said joint body; and
wherein each said resilient collar is radially segmented.

5. A joint for use between two members, at least one of which is of channel section, said joint body also being of substantially channel section and being provided with a pair of inwardly extending trunnions each in turn provided with an inwardly-directed resilient collar, each said trunnion having a bore therethrough,
wherein each said resilient collar forms a frusto-conical shape such that an innermost edge of each said resilient collar has an internal diameter less than that of a diameter of each said bore in each said trunnion.

6. A joint body as claimed in claim 5 wherein each said resilient collar is radially segmented.

* * * * *